(12) United States Patent
Iritani

(10) Patent No.: US 9,137,408 B2
(45) Date of Patent: Sep. 15, 2015

(54) IMAGE FORMING APPARATUS

(71) Applicant: KYOCERA Document Solutions Inc.

(72) Inventor: Kazunobu Iritani, Osaka (JP)

(73) Assignee: Kyocera Document Solutions Inc. (JP)

( * ) Notice: Subject to any disclaimer, the term of this patent is extended or adjusted under 35 U.S.C. 154(b) by 0 days.

(21) Appl. No.: 14/492,548

(22) Filed: Sep. 22, 2014

(65) Prior Publication Data

US 2015/0092211 A1    Apr. 2, 2015

(30) Foreign Application Priority Data

Sep. 27, 2013  (JP) .................................. 2013-201423

(51) Int. Cl.
*G06F 3/12* (2006.01)
*H04N 1/00* (2006.01)
*G03G 15/00* (2006.01)
*G03G 15/08* (2006.01)
*G03G 15/20* (2006.01)

(52) U.S. Cl.
CPC ....... *H04N 1/00907* (2013.01); *H04N 1/00893* (2013.01); *H04N 1/00899* (2013.01); *H04N 1/00901* (2013.01); *H04N 2201/0094* (2013.01)

(58) Field of Classification Search
None
See application file for complete search history.

(56) References Cited

U.S. PATENT DOCUMENTS

2008/0304850 A1* 12/2008 Groninger et al. ............... 399/88
2012/0027423 A1* 2/2012 Kawai ............................. 399/12

FOREIGN PATENT DOCUMENTS

| JP | 2007-003641 | | 1/2007 |
|---|---|---|---|
| JP | 2007003641 A | * | 1/2007 |
| KR | 20070104273 | * | 4/2007 |

* cited by examiner

*Primary Examiner* — Ashish K Thomas
*Assistant Examiner* — Neil R McLean

(57) ABSTRACT

A total-current control unit is configured to add a fuser current of a fuser unit to a load current of the load to thereby obtain a total current to be supplied from a commercial power supply to the image forming apparatus, the total-current control unit being configured to control the total current to be at a predetermined limit value or less. An auxiliary power supply is configured to supply an auxiliary current to the load. The total-current control unit is further configured to provide first control to control the total current to be at the limit value or less and allow the auxiliary power supply to supply the auxiliary current to the load, thereby supplying, to the load, a current obtained by adding the auxiliary current to the load current, if an increase in the load current causes the total current to exceed the limit value.

4 Claims, 7 Drawing Sheets

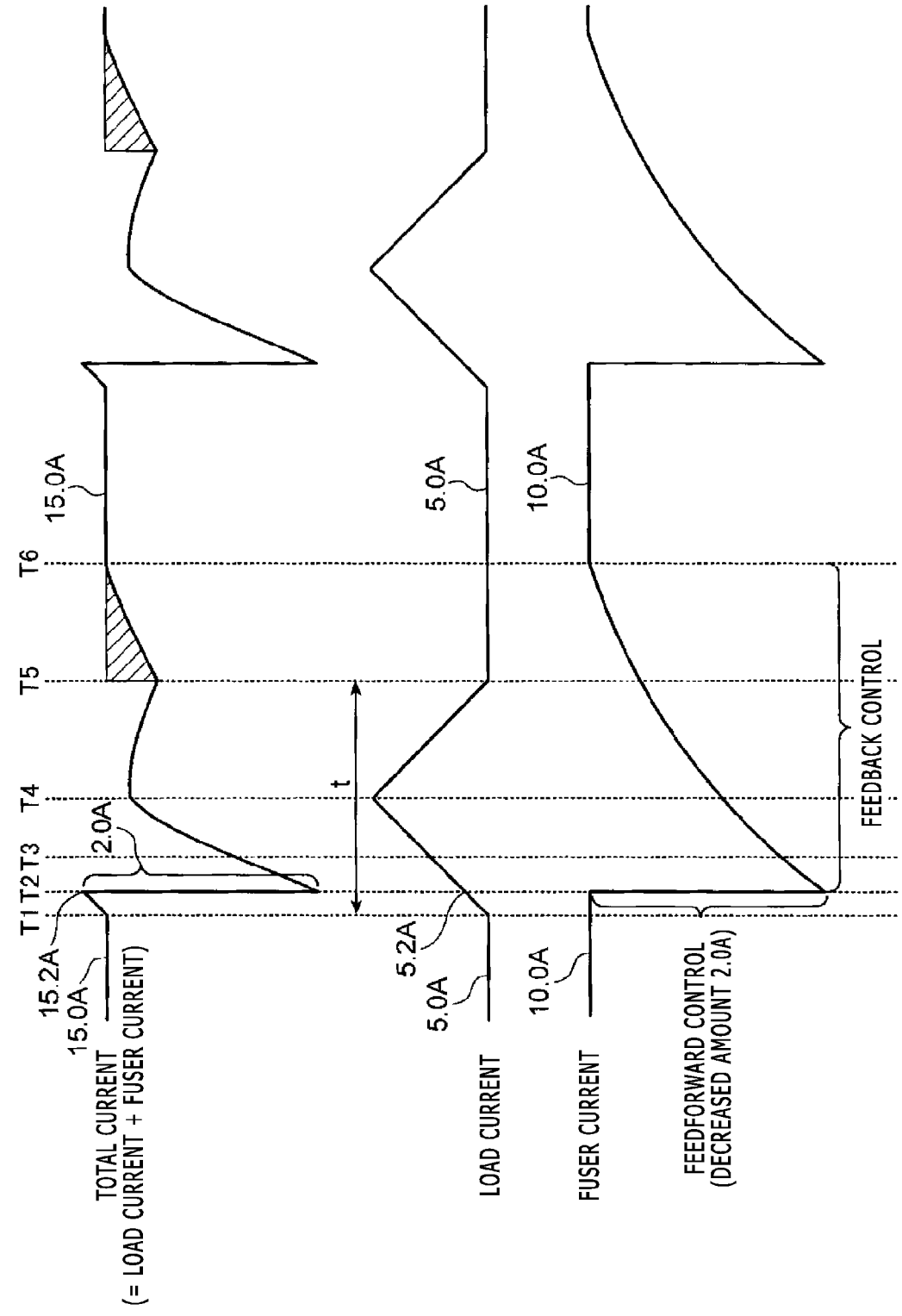

IMAGE FORMING APPARATUS

CROSS-REFERENCE TO RELATED APPLICATIONS

This application relates to and claims priority rights from Japanese Patent Application No. 2013-201423, filed on Sep. 27, 2013, the entire disclosures of which are hereby incorporated by reference herein.

BACKGROUND

1. Field of the Present Disclosure

The present disclosure relates to an image forming apparatus.

2. Description of the Related Art

Some image forming apparatuses are supplied with power from a commercial power supply, and further include an auxiliary power supply in order to improve the performance of the image forming apparatuses. For example, a fuser device in an image forming apparatus may include the following: a heater for use during operation and a heater for use during preheating, which are supplied with an electric current from a primary power supply that is a commercial power supply; a rechargeable battery serving as an auxiliary power supply; and an auxiliary DC heater which is supplied with an electric current from the rechargeable battery.

SUMMARY

An image forming apparatus according to an aspect of the present disclosure includes a fuser unit, a load, a total-current control unit, and an auxiliary power supply. The fuser unit is configured to fix, on a sheet, an image formed on the basis of image data. The load is to be used to execute a job in the image forming apparatus. The total-current control unit is configured to add a fuser current of the fuser unit to a load current of the load to thereby obtain a total current to be supplied from a commercial power supply to the image forming apparatus, the total-current control unit being configured to control the total current to be at a predetermined limit value or less. The auxiliary power supply is configured to supply an auxiliary current to the load. The total-current control unit is further configured to provide first control to control the total current to be at the limit value or less and allow the auxiliary power supply to supply the auxiliary current to the load, thereby supplying, to the load, a current obtained by adding the auxiliary current to the load current, if an increase in the load current causes the total current to exceed the limit value.

These and other objects, features and advantages of the present disclosure will become more apparent upon reading of the following detailed description along with the accompanied drawings.

BRIEF DESCRIPTION OF THE DRAWINGS

FIG. 7 is a time chart illustrating current control according to a comparative example.

DETAILED DESCRIPTION

Figure 1:
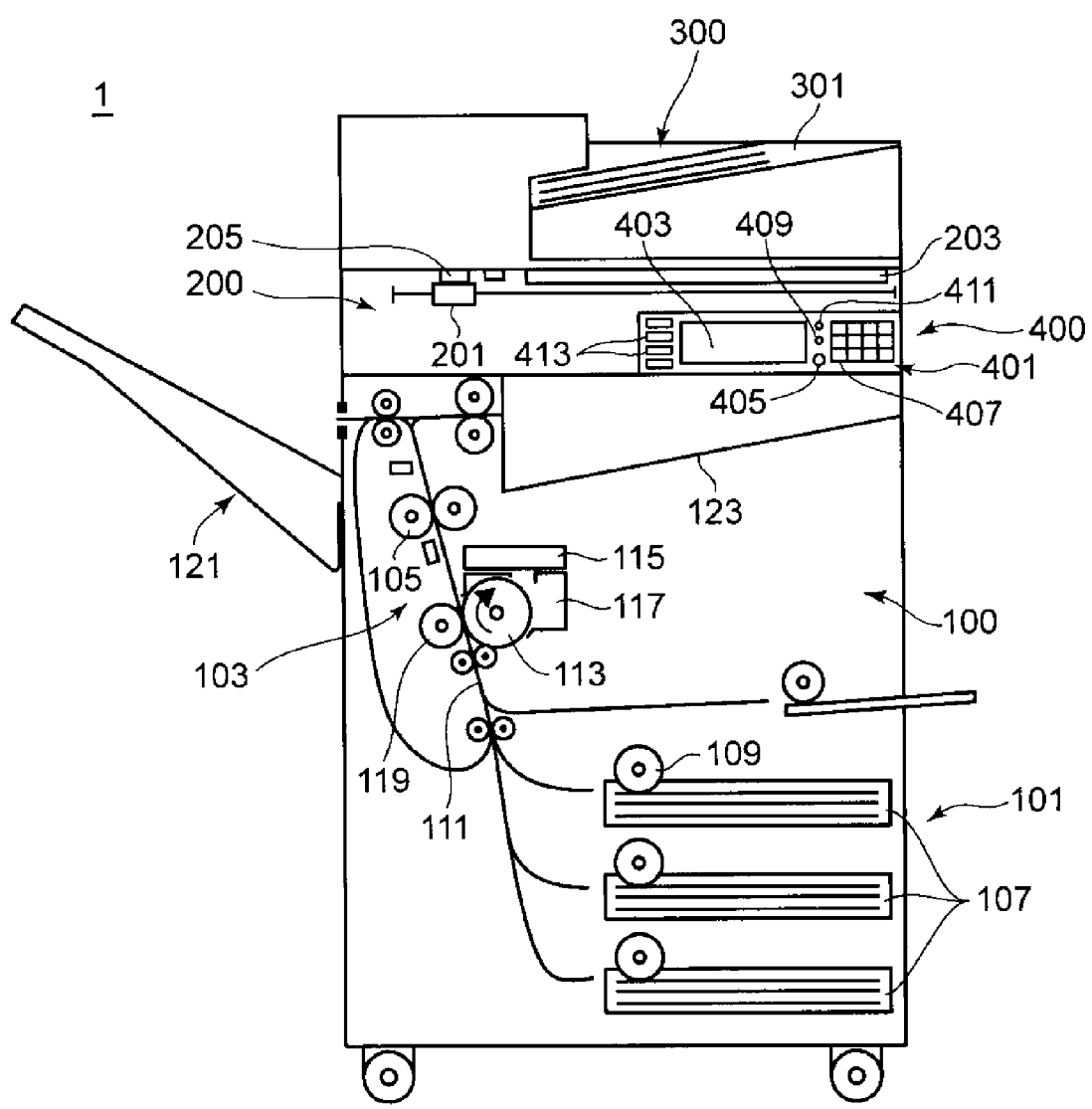
FIG. 1 is a schematic view illustrating the internal structure of an image forming apparatus according to an embodiment of the present disclosure.

Referring to the drawings, an embodiment of the present disclosure will be described in more detail. FIG. 1 is a schematic view illustrating the internal structure of an image forming apparatus 1 according to the embodiment of the present disclosure. For example, the image forming apparatus 1 is a digital multi function peripheral which has functions as a copier, printer, scanner, and facsimile. The image forming apparatus 1 includes a main apparatus body 100, a document read unit 200 disposed on top of the main apparatus body 100, a document feed unit 300 disposed on top of the document read unit 200, and a manipulation unit 400 disposed at an upper front portion of the main apparatus body 100.

The document feed unit 300, which serves as an automatic document feeder, feeds a plurality of documents placed on a document loading unit 301 so that the document read unit 200 can successively read the documents.

The document read unit 200 includes a carriage 201 equipped with an exposure lamp or the like, a document platen 203 made of a transparent member such as glass, a charge coupled device (CCD) sensor (not shown), and a document read slit 205. To read a document placed on the document platen 203, the CCD sensor reads the document while the carriage 201 is being traveled in the longitudinal direction of the document platen 203. In contrast to this, to read a document fed from the document feed unit 300, the carriage 201 is moved to face the document read slit 205, so that the CCD sensor reads, through the document read slit 205, the document fed from the document feed unit 300. The CCD sensor outputs, as image data, the document that has been read.

The main apparatus body 100 includes a sheet storage unit 101, an image forming unit 103, and a fuser unit 105. The sheet storage unit 101 is located at the lowermost part of the main apparatus body 100 and includes sheet trays 107 which can store a bundle of sheets. In the bundle of sheets stored in the sheet trays 107, the uppermost sheet is sent out to a sheet transport path 111 by actuating a pickup roller 109. The sheet is transported to the image forming unit 103 through the sheet transport path 111.

The image forming unit 103 forms a toner image on the transported sheet. The image forming unit 103 includes a photosensitive drum 113, an exposure unit 115, a development unit 117, and a transfer unit 119. The exposure unit 115 generates light which is modulated so as to correspond to image data (for example, image data delivered from the document read unit 200, image data transmitted from a personal computer, or image data received at a facsimile) and then irradiates the circumferential surface of the photosensitive drum 113, which has been uniformly charged, with the resulting light. This allows an electrostatic latent image corresponding to the image data to be formed on the circumferential surface of the photosensitive drum 113. In this state, the development unit 117 supplies toner to the circumferential surface of the photosensitive drum 113, thereby allowing a toner image corresponding to the image data to be formed on the circumferential surface thereof. This toner image is transferred by the transfer unit 119 to a sheet transported from the sheet storage unit 101 as described above.

The sheet onto which the toner image has been transferred is fed to the fuser unit 105. The fuser unit 105 applies heat and pressure to the toner image and the sheet, thereby causing the toner image to be fixed onto the sheet. The sheet is discharged to a stack tray 121 or an exit tray 123.

The manipulation unit 400 includes a manipulation key unit 401 and a display unit 403. The display unit 403 has a touch panel function and displays a screen that includes soft keys. The user makes the settings, which are required to execute functions such as copying, by manipulating the soft keys while viewing the screen.

The manipulation key unit 401 is provided with manipulation keys implemented by hard keys. More specifically, for example, provided are a start key 405, ten-key pads 407, a stop key 409, a reset key 411, and a function switching key 413 for switching between the copier, printer, scanner, and facsimile.

The start key 405 is used to start, for example, the operation of copying and facsimile transmission. The ten-key pads 407 are used to input numerical values such as the number of copies and facsimile numbers. For example, the stop key 409 is used to stop copying halfway. The reset key 411 is used to initialize the contents of settings.

The function switching key 413, which includes, for example, a copy key and a transmission key, switches between the copy function and the transmission function. Manipulating the copy key will cause an initial copy screen to be displayed on the display unit 403. Manipulating the transmission key will cause the initial screen for facsimile transmission and mail transmission to be displayed on the display unit 403.

Figure 2:
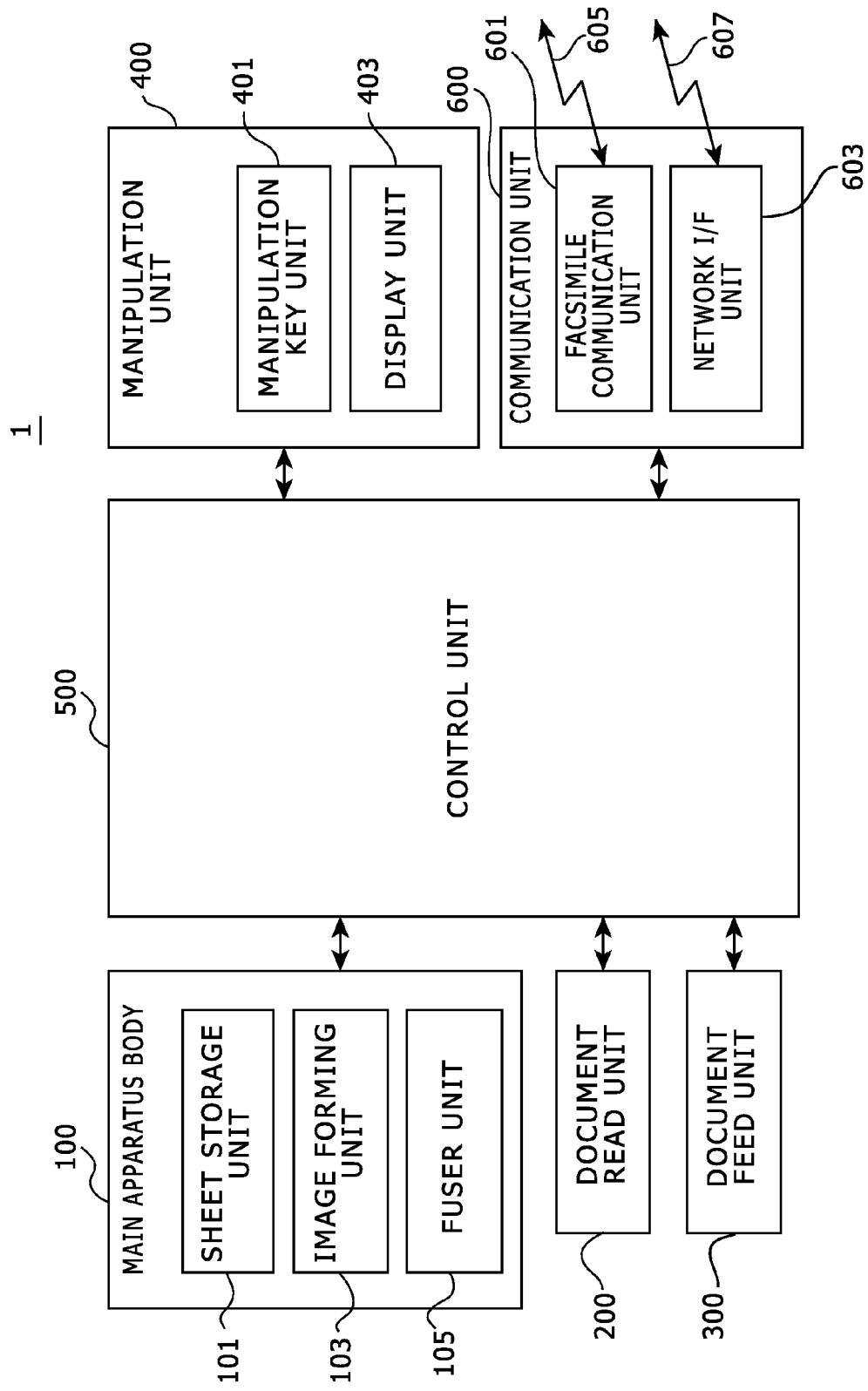
FIG. 2 is a block diagram illustrating the configuration of the image forming apparatus shown in FIG. 1.

FIG. 2 is a block diagram illustrating the configuration of the image forming apparatus 1 shown in FIG. 1. The image forming apparatus 1 is configured in a manner such that the main apparatus body 100, the document read unit 200, the document feed unit 300, the manipulation unit 400, a control unit 500, and a communication unit 600 are connected to each other through a bus. The main apparatus body 100, the document read unit 200, the document feed unit 300, and the manipulation unit 400 have already been described above and thus will not be described again.

The control unit 500 includes, for example, a central processing unit (CPU), a read only memory (ROM), a random access memory (RAM), and an image memory. The CPU performs control required to operate the image forming apparatus 1 on the aforementioned components of the image forming apparatus 1 such as the main apparatus body 100. The ROM is configured to store software required to control the operation of the image forming apparatus 1. The RAM is used to temporarily store data generated during execution of software and to store application software. The image memory temporarily stores image data (for example, image data delivered from the document read unit 200, image data transmitted from a personal computer, and image data received by a facsimile).

The communication unit 600 includes a facsimile communication unit 601 and a network I/F unit 603. The facsimile communication unit 601 includes a network control unit (NCU) configured to control a telephone line connection to a facsimile on the other end and a modem circuit for modulating and demodulating facsimile communication signals. The facsimile communication unit 601 is connected to a telephone line 605.

The network I/F unit 603 is connected to a local area network (LAN) 607. The network I/F unit 603 serves as a communication interface circuit which executes communications with a terminal device such as a personal computer that is connected to the LAN 607.

Figure 3:
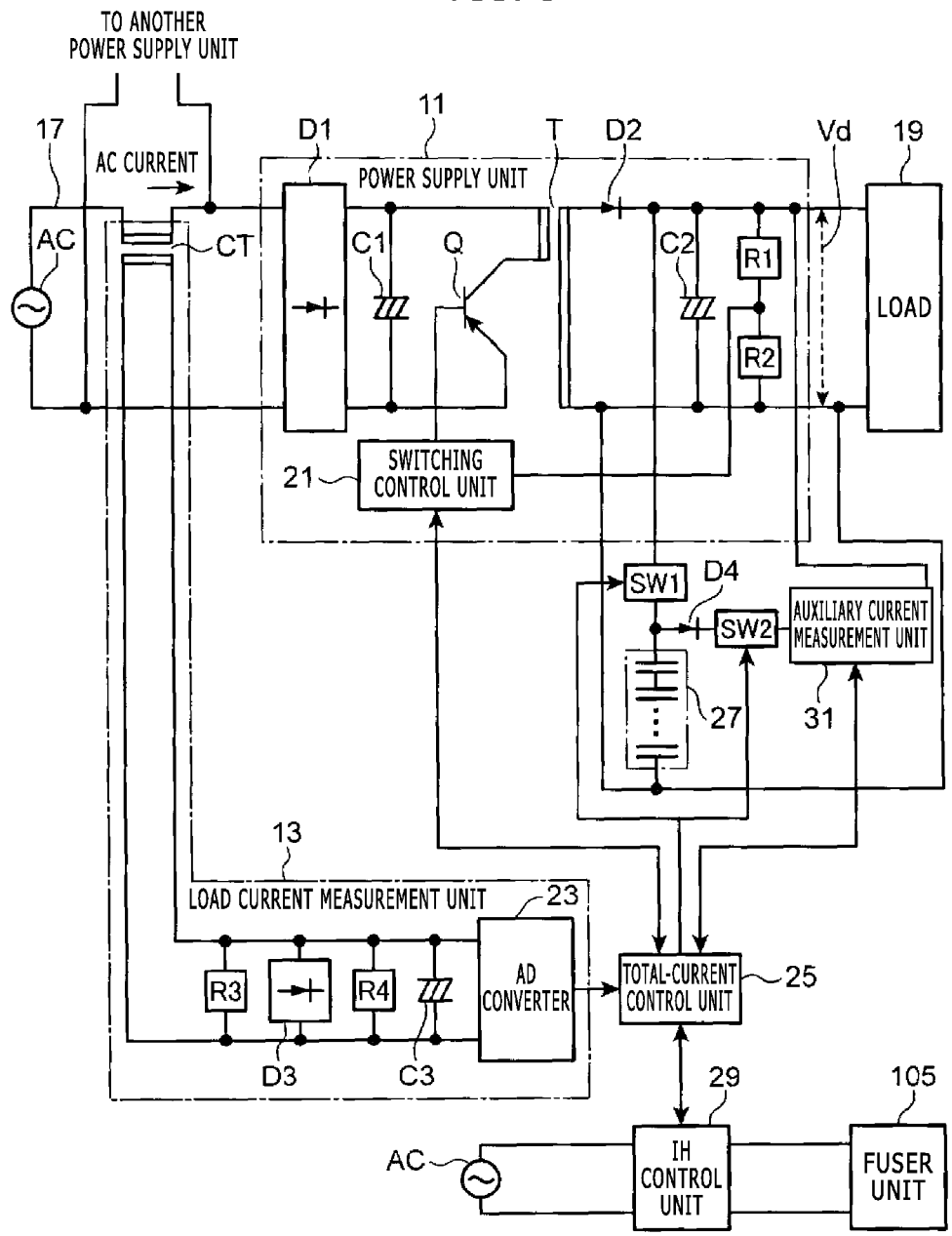
FIG. 3 is a circuit diagram of a current control system included in the image forming apparatus according to the embodiment of the present disclosure.

FIG. 3 is a circuit diagram of a current control system included in the image forming apparatus 1 according to the embodiment. This system includes a power supply unit 11, a load current measurement unit 13, a total-current control unit 25, an auxiliary power supply 27, and an induction heating (IH) control unit 29.

The image forming apparatus 1 forms an image on the basis of image data and then causes the fuser unit 105 to fix the image on a sheet for output.

The power supply unit 11, which is an example of the load current generation unit, supplies a current from a commercial power supply AC as a load current to a load 19 that is used to execute a job in the image forming apparatus 1. As used herein, the load refers to a load other than the fuser unit 105, for example, a motor or solenoid which is used in a sheet transport system, a punching unit, or a stapling unit.

The configuration of the power supply unit 11 will be described in detail. The power supply unit 11 employs the AC voltage supplied from the commercial power supply AC to produce a supply voltage that is used to operate the image forming apparatus 1. The image forming apparatus 1 includes a plurality of power supply units (a plurality of load current generation units) for producing DC voltages that are different from each other, one of the power supply units being illustrated in FIG. 3. The power supply unit 11 produces a supply voltage (in other words, the load current) for driving the load 19 of the stapling unit in the image forming apparatus 1. Another power supply unit produces a supply voltage which drives, for example, a load to be used in the sheet transport system or a load to be used for punching.

The image forming apparatus 1 includes a power supply line 17. The power supply line 17 connects the commercial power supply AC to a plurality of power supply units (including the power supply unit 11) of the image forming apparatus 1.

The power supply unit 11 includes a diode bridge D1, a diode D2, capacitors C1 and C2, a transformer T, a transistor Q (switching element), resistors R1 and R2, and a switching control unit 21.

The AC voltage supplied from the commercial power supply AC through the power supply line 17 is rectified by the diode bridge D1 and then smoothed by the capacitor C1. Then, the voltage across the ends of the capacitor C1 is applied to the series circuit of the primary winding of the transformer T and the transistor Q.

The gate of the transistor Q is connected to the switching control unit 21. Turning the transistor Q ON or OFF in response to a control signal from the switching control unit 21 will cause a high-frequency current to flow through the primary winding of the transformer T and thereby induce a high-frequency voltage on the secondary winding of the transformer T due to electromagnetic coupling. The high-frequency voltage induced on the secondary winding of the transformer T is rectified by the diode D2 and then smoothed by the capacitor C2, so that a supply voltage Vd is produced. The supply voltage Vd is supplied to the load 19.

The supply voltage Vd is divided by the series circuit of the resistors R1 and R2. Then, the divided voltage is delivered to the switching control unit 21, thereby providing the supply voltage Vd as feedback to the switching control unit 21. The switching control unit 21 provides control so that the supply voltage Vd takes on a preset constant voltage by varying the duty ratio, at which the transistor Q is turned ON and OFF, so as to cause the feedback voltage to be at a preset target value.

The IH control unit 29, which is an example of the fuser current generation unit, supplies a current from the commercial power supply AC as a fuser current to the fuser unit 105. The fuser unit 105 is an IH fuser device which fixes an image on a sheet by electromagnetic induction heating. In the embodiment, the commercial power supply AC to which the power supply unit 11 and another power supply unit are connected and the commercial power supply AC to which the IH control unit 29 is connected are different from each other, but may also be the same. Note that as the fuser unit 105, a halogen-lamp type fuser device may also be employed.

The load current measurement unit 13 measures the total current which is supplied from the commercial power supply AC to the power supply unit 11 and another power supply unit. That is, the load current measurement unit 13 measures a load current being supplied from the commercial power supply AC to the image forming apparatus 1. The load current measurement unit 13 includes a current transformer CT, resistors R3 and R4, a diode bridge D3, a capacitor C3, and an AD converter 23.

The current transformer CT is connected to the power supply line 17, and includes a primary winding and a secondary winding. Part of the power supply line 17 serves as the primary winding of the current transformer CT. The load current to be supplied to the image forming apparatus 1 flows through the power supply line 17, and is converted into a microcurrent by the current transformer CT. The secondary winding of the current transformer CT through which the microcurrent flows is connected in parallel with each of the resistor R3, the diode bridge D3, the resistor R4, and the capacitor C3.

The resistor R3 provides a voltage signal depending on the microcurrent. In this manner, the resistor R3 serves as a current voltage converter which converts the current detected by the current transformer CT into a voltage signal for output. This voltage signal is full-wave rectified by the diode bridge D3, which is an example of the rectifier diode, and then smoothed by the capacitor C3, which is an example of the smoothing capacitor. The resistor R4, which is a discharge resistor for the capacitor C3, can be reduced to provide improved trackability of a voltage signal to a change in the total current.

The voltage signal smoothed by the capacitor C3 is converted into a digital signal by the AD converter 23. Thus, the AD converter 23 converts the voltage signal delivered from the resistor R3 (a current voltage converter) into a digital signal.

This digital signal is sent to the total-current control unit 25.

The total-current control unit 25 employs a current obtained by adding the fuser current to the load current as the total current that is supplied from the two commercial power supplies AC to the image forming apparatus 1, and controls the total current to be at a predetermined limit value or less. The total-current control unit 25 employs, as the total current, the value that is obtained by adding a value of the fuser current for which the total-current control unit 25 commanded the IH control unit 29 to a value of the load current measured by the load current measurement unit 13. The total-current control unit 25 is implemented by the CPU, the ROM, and the RAM which are included in the control unit 500 of the image forming apparatus 1.

The auxiliary power supply 27, which is formed of a capacitor, supplies an auxiliary current to the load 19 to which the load current is supplied. In place of the capacitor, it is also possible to employ a rechargeable battery as the auxiliary power supply 27.

The auxiliary power supply 27 is connected to the load 19 to which the power supply unit 11 supplies power. Furthermore, the conductor connecting between one electrode of the auxiliary power supply 27 and the load 19 is connected in series with a diode D4, a second switch SW2, and an auxiliary current measurement unit 31.

The auxiliary current measurement unit 31 measures the auxiliary current supplied from the auxiliary power supply 27 to the load 19. The auxiliary current measurement unit 31 is constructed in the same manner as the load current measurement unit 13. The second switch SW2 is switched between ON and OFF by the control of the total-current control unit 25. In an ON state of the second switch SW2, the capacitor serving as the auxiliary power supply 27 is discharged to supply the auxiliary current to the load 19. In an OFF state of the second switch SW2, the auxiliary power supply 27 and the load 19 are disconnected from each other to supply no auxiliary current to the load 19.

In an ON state of the second switch SW2, the diode D4 serves to block the flow of the load current produced by the power supply unit 11 into the auxiliary power supply 27.

Furthermore, the one electrode of the auxiliary power supply 27 is connected via a first switch SW1 to a conductor connecting between the diode D2 and the capacitor C2 among those conductors that connect between the secondary winding of the transformer T, the diode D2, and the capacitor C2. As described above, the first switch SW1 is provided on the conductor connecting between the auxiliary power supply 27 and the power supply unit 11 (the load current generation unit). The first switch SW1 is switched between ON and OFF by the total-current control unit 25. With the first switch SW1 in an ON state, the load current from the power supply unit 11 is supplied to the auxiliary power supply 27, thereby charging the auxiliary power supply 27. With the first switch SW1 in an OFF state, the power supply unit 11 and the auxiliary power supply 27 are disconnected from each other, thereby stopping charging of the auxiliary power supply 27.

Figure 4:
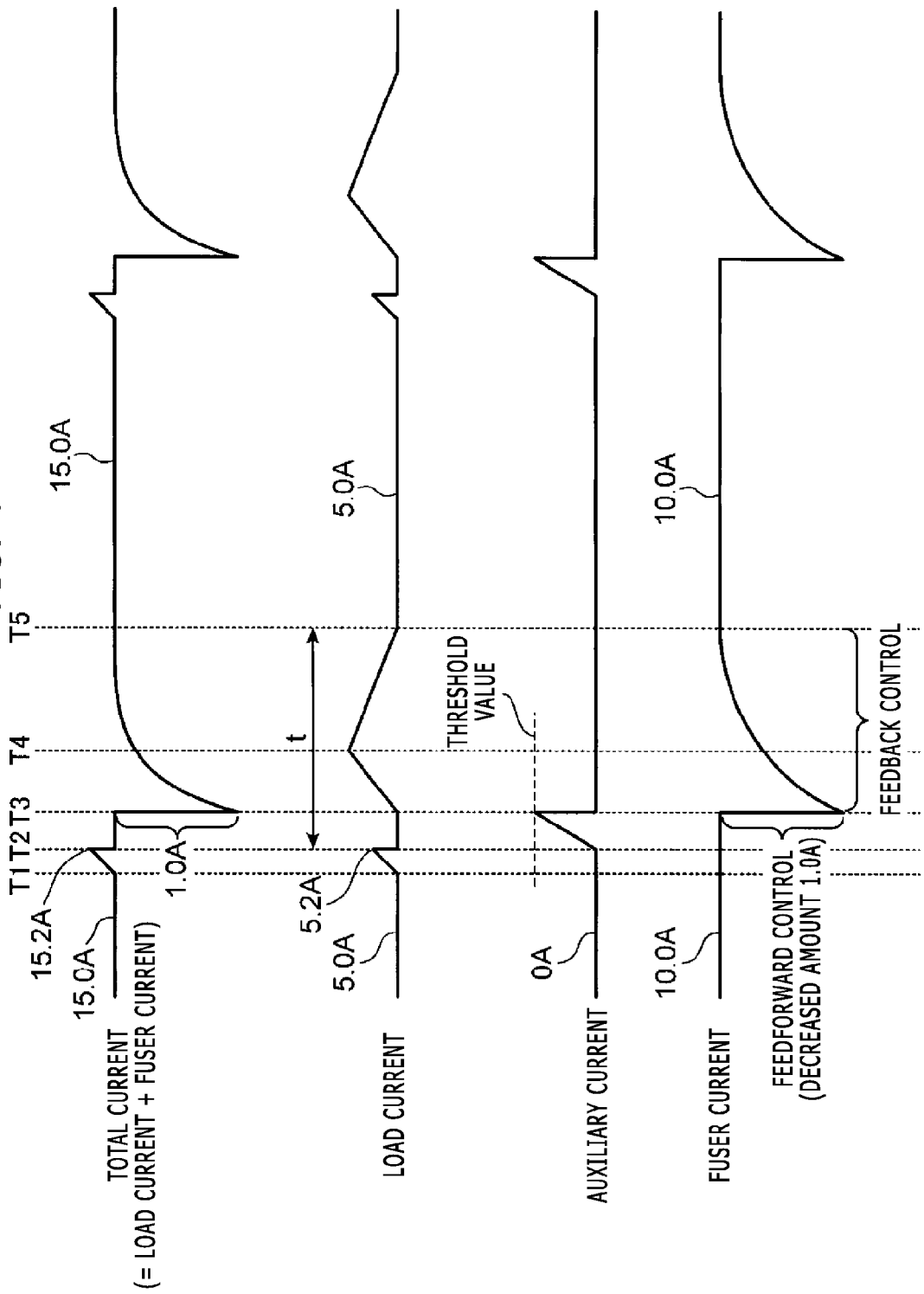
FIG. 4 is a time chart (1/2) illustrating the current control that is provided by the image forming apparatus according to the embodiment of the present disclosure.
Figure 5:
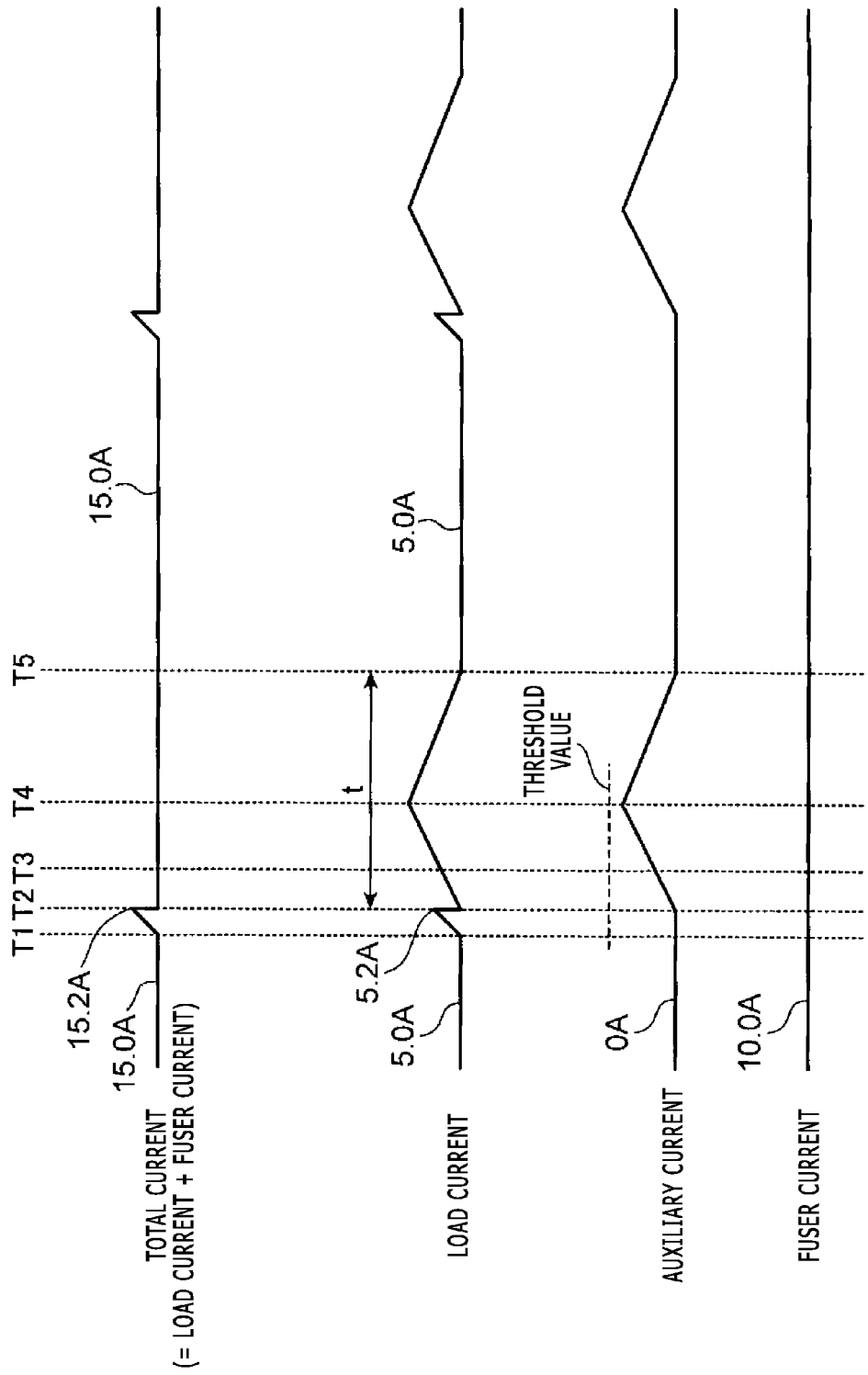
FIG. 5 is a time chart (2/2) illustrating the current control that is provided by the image forming apparatus according to the embodiment of the present disclosure.
Figure 6:
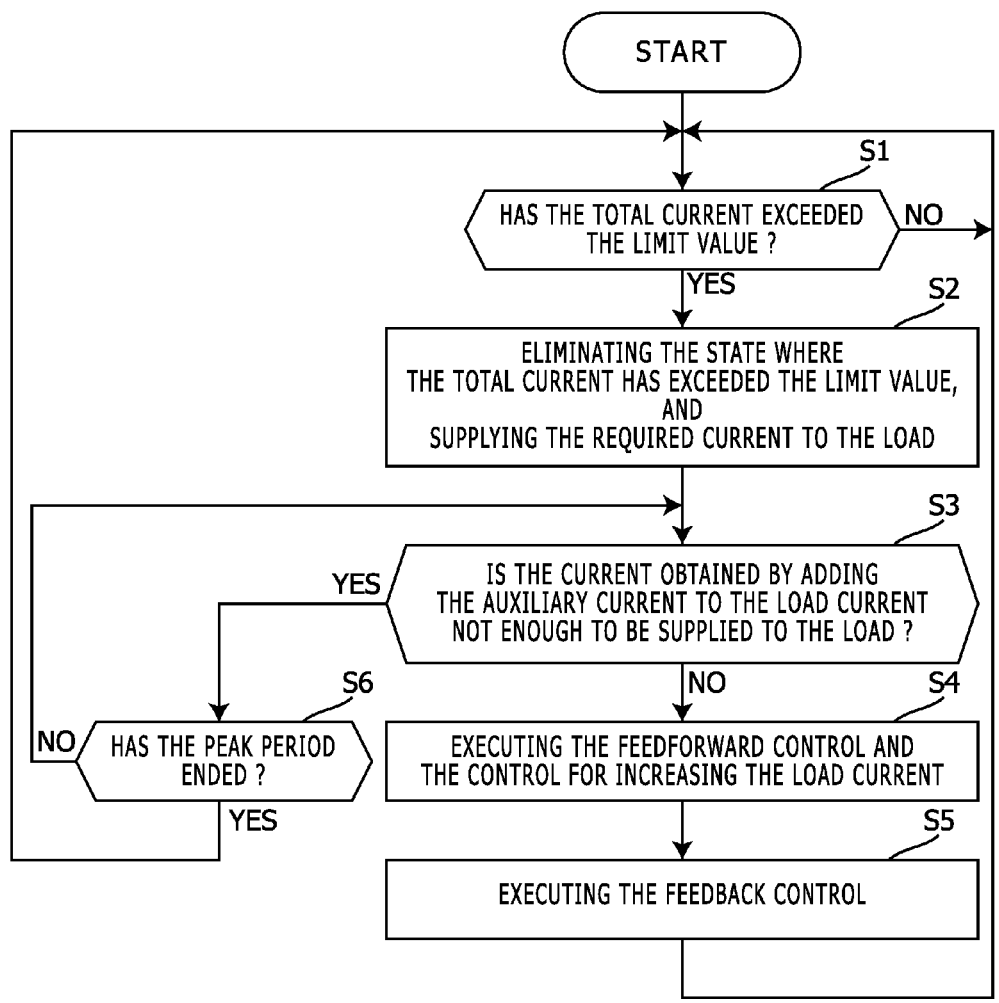
FIG. 6 is a flowchart illustrating the current control that is provided by the image forming apparatus according to the embodiment of the present disclosure.

Now, a description will be made to the current control to be executed by the image forming apparatus 1 according to the embodiment. FIGS. 4 and 5 are each a time chart illustrating this current control. FIG. 6 is a flowchart illustrating this current control. FIG. 4 illustrates the case where the current obtained by adding the auxiliary current to the load current is not enough to be supplied to the load 19, and thus feedforward control is performed to reduce the fuser current. FIG. 5 illustrates the case where the current obtained by adding the auxiliary current to the load current is enough to be supplied to the load 19, and thus the feedforward control to reduce the fuser current is not performed.

It is assumed that the total current to be supplied from the commercial power supply AC to the image forming apparatus 1 has a limit value of 15.0 A; the fuser current has a target value of 10.0 A; and the fuser current is reduced by an amount of decrease of 1.0 A by the feedforward control.

Referring to FIGS. 4 and 5, the load current has a peak period t that occurs cyclically. The peak period t refers to the period of the load current in which the total current would exceed the limit value unless control is provided to supply the auxiliary current to the load 19 or feedforward control is performed on the fuser current. For example, the period of stapling is the peak period t when the image forming apparatus 1 prints a predetermined number of sheets and then executes the job for stapling the sheets. The peak period t occurs each time the job is executed.

The total-current control unit 25 determines whether the total current has exceeded the limit value of 15.0 A (step S1). The total-current control unit 25 has caused the IH control unit 29 to produce the target value, 10.0 A of the fuser current. Furthermore, up to time T1 shown in FIG. 4 and FIG. 5, the load current measured by the load current measurement unit 13 is 5.0 A. Thus, since the total current is 15.0 A (=10.0 A+5.0 A) up to time T1, the total-current control unit 25 does not determine that the total current has exceeded 15.0 A (No in step S1), and the process returns to step S1 to repeat the processing of step S1.

Since the load current measured by the load current measurement unit 13 starts to increase at time T1 from 5.0 A and reaches 5.2 A at time T2 shown in FIG. 4 and FIG. 5, the total-current control unit 25 determines that the total current has exceeded the limit value of 15.0 A (Yes in step S1). By way of example, 5.2 A may be based to determine whether the total current has exceeded 15.0 A.

As shown in FIGS. 4 and 5, to eliminate the state where the total current has exceeded the limit value, the total-current control unit 25 causes the power supply unit 11 to execute control to reduce the load current down to 5.0 A, and in order to supply a current required for the load 19, provides control so that the auxiliary power supply 27 supplies the auxiliary current to the load 19 (step S2). This allows the current obtained by adding the auxiliary current to the load current (5.0 A) to be supplied to the load 19, with the total current reduced to the limit value of 15.0 A (from time T2 onward as shown in FIG. 4 and FIG. 5).

Referring to FIG. 3, a description will be made more specifically to the control that is provided to supply the auxiliary current from the auxiliary power supply 27 to the load 19. The total-current control unit 25 provides control to manipulate the first switch SW1 and thereby disconnect the auxiliary power supply 27 and the power supply unit 11 from each other, and provides control to manipulate the second switch SW2 and thereby connect between the auxiliary power supply 27 and the load 19. This allows for stopping charging the auxiliary power supply 27 using the current from the power supply unit 11 (the load current generation unit) and supplying the auxiliary current from the auxiliary power supply 27 to the load 19.

The total-current control unit 25 determines whether the current obtained by adding the auxiliary current to the load current is not enough to be supplied to the load 19 (step S3). In the embodiment, when the auxiliary current has reached a predetermined threshold value, it is determined that the current obtained by adding the auxiliary current to the load current is not enough to be supplied to the load 19. FIG. 4 shows that since the auxiliary current has reached the threshold value at time T3 during the peak period t, the current obtained by adding the auxiliary current to the load current is not enough to be supplied to the load 19. In contrast to this, FIG. 5 shows that since the auxiliary current has not yet reached the threshold value during the peak period t, the current obtained by adding the auxiliary current to the load current is enough to be supplied to the load 19.

First, a description will be made to the case of FIG. 4. The total-current control unit 25 determines that since the auxiliary current measured by the auxiliary current measurement unit 31 has reached the threshold value at time T3, the current obtained by adding the auxiliary current to the load current is not enough to be supplied to the load 19 (Yes in step S3).

Then, the total-current control unit 25 causes the IH control unit 29 to execute feedforward control for reducing the fuser current by 1.0 A and the power supply unit 11 to execute control for increasing the load current (step S4). Furthermore, the total-current control unit 25 provides control to manipulate the first switch SW1 shown in FIG. 3 so as to connect between the auxiliary power supply 27 and the power supply unit 11, and provides control to manipulate the second switch SW2 so as to disconnect the auxiliary power supply 27 and the load 19 from each other. This allows the current from the power supply unit 11 to charge the auxiliary power supply 27 and the supply of the auxiliary current from the auxiliary power supply 27 to the load 19 to be stopped.

Not feedback control but feedforward control is provided because the fuser current can be immediately reduced by a predetermined amount of decrease so as to prevent the total current from exceeding the limit value even in the presence of an increase in the load current.

Now, the feedforward control to be executed will be briefly described. The data that associates the processing, in which the peak period t occurs, with the amount of decrease in the fuser current assigned to the processing is stored in advance in a storage unit which is included in the IH control unit 29. For example, an amount of decrease d1 in the fuser current is assigned to the stapling, and an amount of decrease d2 in the fuser current is assigned to the punching. The amount of decrease in the fuser current is specified so that the total current will not exceed the limit value even in the presence of an increase in the load current after the feedforward control. The IH control unit 29 provides control to reduce the fuser current by the amount of decrease (here, 1.0 A) that is assigned to the processing during which the peak period t occurs.

The IH control unit 29 provides feedforward control to reduce the fuser current, and after that, starts to control to increase the fuser current to the target value of 10.0 A (step S5: time T3). For this control, employed is feedback control like the proportional integral derivative (PID) control so as to prevent the total current from exceeding the limit value. As described above, when the IH control unit 29 supplies the current from the commercial power supply AC as the fuser current to the fuser unit 105, so that the total current exceeds the limit value and thus the feedforward control is provided to reduce the fuser current by a predetermined amount of decrease, the IH control unit 29 provides feedback control to increase the fuser current to the target value.

The feedback control requires relatively long time to increase the fuser current to the target value. Thus, since the feedback control is provided to increase the fuser current to the target value after the feedforward control is provided to reduce the fuser current, there will occur a period in which the total current to be used cannot be raised to the limit value (period from time T3 to time T5).

Because from time T3 onward, the load current continues to increase and the fuser current is increased by the feedback control, the total current also continues to increase. However, since at time T3, the feedforward control is performed on the fuser current so as to reduce the total current (in this example, the amount of decrease in the total current is 1.0 A), the total current is reduced to 15.0 A or less.

The load current takes on the maximum value at time T4 and after that, is reduced to 5.0 A at time T5, and the peak period t is ended. Then, the process returns to step S1.

On the other hand, as shown in FIG. 5, the total-current control unit 25 determines that the current obtained by adding the auxiliary current to the load current is enough to be supplied to the load 19 unless the auxiliary current measured by the auxiliary current measurement unit 31 is determined to have reached the threshold value (No in step S3).

If No in step S3, the total-current control unit 25 determines whether the peak period t has ended (step S6). If the total current is determined to have exceeded the limit value (Yes in step S1), the total-current control unit 25 starts to measure the peak period t and determines whether the peak period t assigned in advance depending on the processing has elapsed. For example, a peak period t1 is set for the stapling and a peak period t2 is set for the punching, and those pieces of data are stored in advance in the storage unit of the total-current control unit 25. The total-current control unit 25 determines that the peak period t has ended if the peak period t is determined to have elapsed.

If the total-current control unit 25 does not determine that the peak period t has ended (No in step S6), then the process returns to step S3. If the total-current control unit 25 determines that the peak period t has ended (Yes in step S6), then the process returns to step S1.

Now, a description will be made to current control according to a comparative example. FIG. 7 is a time chart illustrating the current control according to the comparative example. In the comparative example, no auxiliary current is supplied to the load 19. Thus, the amount of decrease (2.0 A) in the fuser current by the feedforward control is greater as compared with that of the embodiment. The limit value of the total current (15.0 A), the target value of the fuser current (10.0 A), and the length of the peak period t are the same as those of the embodiment.

Like the embodiment, the comparative example is configured such that the load current starts to increase from 5.0 A at time T1 and then reaches 5.2 A at time T2. Thus, in the comparative example, like the embodiment, it is determined that the total current has exceeded the limit value of 15.0 A at time T2.

In the comparative example, unlike the embodiment, no control is provided to supply the auxiliary current to the load 19. Thus, when the total current is determined to have exceeded the limit value, feedforward control for the amount of decrease of 2.0 A is performed on the fuser current (time T2). The amount of decrease in the fuser current is specified so that the total current will not exceed the limit value even in the presence of an increase in the load current after the feedforward control. In the comparative example, a larger amount of decrease is set as compared with that of the embodiment because no auxiliary current is supplied to the load 19 (2.0 A).

The feedforward control reduces the total current from 15.2 A to 2.0 A, so that from time T2 onward, the total current can be reduced to the limit value or less even in the presence of an increase in the load current.

Considering the embodiment and the comparative example, the following conclusions can be reached. As shown in FIGS. 4 and 7, when feedback control for controlling the fuser current at a target value (hereafter, the feedback control) is provided after the feedforward control is performed on the fuser current, a relatively long time is required to increase the fuser current to the target value so that the total current will not exceed the limit value. During the period of the feedback control, the total current to be used cannot be raised up to the limit value. In the embodiment, the feedback control is provided during the period from time T3 to time T5 (in which the total current to be used cannot be raised to the limit value). In the comparative example, the feedback control is provided during the period from time T2 to time T6 (in which the total current to be used cannot be raised to the limit value).

The amount of decrease in the fuser current for the feedforward control in the comparative example (2.0 A) is greater than the amount of decrease in the embodiment (1.0 A). This is because no auxiliary current is supplied to the load 19 in the comparative example, and thus the total current would exceed the limit value due to an increase in the load current unless a larger amount of decrease in the fuser current is employed as compared with that of the embodiment. As compared with the comparative example, the embodiment employs a smaller amount of decrease in the fuser current for the feedforward control. Thus, the embodiment provides a shorter period of feedback control as compared with the comparative example.

Now, a description will be made to the main effects of the embodiment. In the embodiment, the total-current control unit 25 provides the following two types of control when the load current increases and thereby the total current exceeds the limit value. One is to control the total current to be at the limit value or less (step S2, time T2 of FIGS. 4 and 5). This allows for preventing the total current being supplied from the commercial power supply AC to the image forming apparatus 1 from exceeding the limit value. The other is to provide control so that the auxiliary power supply 27 supplies the auxiliary current to the load 19 and then the current obtained by adding the auxiliary current to the load current is supplied to the load 19 (step S2, from time T2 onward in FIGS. 4 and 5). This allows for supplying a current of a required magnitude to the load 19 and thus preventing degradation of the performance of the image forming apparatus 1.

Furthermore, as shown in FIG. 5, when the current obtained by adding the auxiliary current to the load current is enough to be supplied to the load 19 (No in step S3), the total-current control unit 25 does not cause the IH control unit 29 to execute the feedforward control for reducing the fuser current. Thus, since the feedback control for increasing the fuser current to the target value is not provided, it is possible to prevent the occurrence of the period in which the total current to be used cannot be raised to the limit value.

On the other hand, as shown in FIG. 4, when the current obtained by adding the auxiliary current to the load current is not enough to be supplied to the load 19 (Yes in step S3), the total-current control unit 25 causes the IH control unit 29 to execute the feedforward control for reducing the fuser current and the power supply unit 11 to execute control to increase the load current (from time T3 onward). This allows for preventing degradation in the performance of the load 19 while controlling the total current to be at the limit value or less. Since the auxiliary current is supplied to the load 19 in addition to the load current, the amount of decrease (the amount of drop) in the fuser current can be reduced. Thus, since the period required to increase the fuser current to the target value by the feedback control can be reduced, it is possible to shorten the period in which the total current to be used cannot be raised to the limit value.

According to the embodiment, the IH control unit 29 sets the amount of decrease (the amount of drop) in the fuser current and the auxiliary power supply 27 sets the value of the auxiliary current that can be supplied to the load 19 so that the feedback control on the fuser current can be ended during the peak period t of the load current illustrated from time T2 to time T5 in FIG. 4 (for example, during the period of the punching or stapling). This allows for preventing the occurrence of the period after the peak period t onward in which the total current to be used cannot be raised to the limit value.

In contrast to this, as shown in FIG. 7, the comparative example shows that since the feedback control has not been ended in the peak period t (i.e., the fuser current has not reached the target value by the feedback control), there occurs a period after the peak period t in which the total current to be used cannot be raised to the limit value (the diagonally shaded area from time T5 to time T6.)

An increase in the value of the auxiliary current could reduce the amount of decrease in the fuser current. A decrease in the amount of decrease of the fuser current could shorten the period of the feedback control. It is thus possible to end the feedback control during the peak period t by appropriately setting each of the value of the auxiliary current and the amount of decrease in the fuser current.

According to the embodiment, in step S2, the total-current control unit 25 disconnects the auxiliary power supply 27 and the power supply unit 11 from each other by providing control to manipulate the first switch SW1, and connects between the auxiliary power supply 27 and the load 19 by providing control to manipulate the second switch SW2. This allows for stopping charging of the auxiliary power supply 27 and supplying the auxiliary current to the load 19. Then, in step S4, the total-current control unit 25 provides control to manipulate the first switch SW1 and thereby connect between the auxiliary power supply 27 and the power supply unit 11, and provides control to manipulate the second switch SW2 and thereby disconnect the auxiliary power supply 27 and the load 19. This allows the current from the power supply unit 11 to charge the auxiliary power supply 27 and the supply of the auxiliary current to the load 19 to be stopped.

As described above, according to the embodiment, when an increase in the load current causes the total current to exceed the limit value, the auxiliary current is supplied to the load 19 (step S2). Then, when the feedforward control is provided to reduce the fuser current because the current obtained by adding the auxiliary current to the load current is not enough to be supplied to the load 19 (step S4), the current from the power supply unit 11 is used to charge the auxiliary power supply 27. Thus, the cycle of discharging and charging can be repeated when the peak period t occurs cyclically.

Furthermore, according to the embodiment, as shown in FIG. 4, when the auxiliary current measured by the auxiliary current measurement unit 31 has increased to the predetermined threshold value in step 5 (time T3), the total-current control unit 25 determines that the current obtained by adding the auxiliary current to the load current is not enough to be supplied to the load 19 (step S3). The determination of whether the current obtained by adding the auxiliary current to the load current is enough to be supplied to the load 19 may be made when the capacitor or the auxiliary power supply 27 has been completely discharged. However, since it is not easy to determine when the capacitor has been completely discharged, the aforementioned determination is made when the auxiliary current has increased to the predetermined threshold value.

According to the embodiment, since it is determined whether the total current has exceeded the limit value due to an increase in the load current (step S1), it is necessary to specify the increase in the load current and to specify the value of the total current. As shown in FIG. 3, in the embodiment, the total-current control unit 25 determines, as the total current, the value that is obtained by adding a value of the fuser current for which the total-current control unit 25 commanded the IH control unit 29 to a value of the load current measured by the load current measurement unit 13. This allows for specifying the increase in the load current and specifying the value of the total current.

The description has been presented for purposes of illustration and description, and is not intended to be exhaustive or limited.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:
1. An image forming apparatus comprising:
a fuser unit configured to fix, on a sheet, an image formed on the basis of image data;
a load to be used to execute a job in the image forming apparatus;
a total-current control unit configured to add a fuser current of the fuser unit to a load current of the load to thereby obtain a total current to be supplied from a commercial power supply to the image forming apparatus, the total-current control unit being configured to control the total current to be at a predetermined limit value or less;
an auxiliary power supply configured to supply an auxiliary current to the load; wherein the total-current control unit is further configured to provide first control to control the total current to be at the limit value or less and allow the auxiliary power supply to supply the auxiliary current to the load, thereby supplying, to the load, a current obtained by adding the auxiliary current to the load current, if an increase in the load current causes the total current to exceed the limit value;
a fuser current generation unit configured to supply a current from the commercial power supply to the fuser unit as the fuser current and provide feedback control so as to increase the fuser current to a target value when the total current exceeds the limit value and feedforward control is thus provided to reduce the fuser current by a predetermined amount of decrease; and
a load current generation unit configured to supply a current from the commercial power supply to the load as the load current; wherein the total-current control unit is further configured: (a) to cause, in the first control, the fuser current generation unit not to execute the feedforward control when the current obtained by adding the auxiliary current to the load current is enough to be supplied to the load; and (b) to provide, in the first control, second control in a manner such that when the current obtained by adding the auxiliary current to the load current is not enough to be supplied to the load, the fuser current generation unit is caused to execute the feedforward control and the load current generation unit is caused to execute control for increasing the load current;
a first switch provided on a conductor connecting between the auxiliary power supply and the load current generation unit;
a second switch provided on a conductor connecting between the auxiliary power supply and the load;
wherein the auxiliary power supply is formed of a capacitor, and
the total-current control unit is further configured:
(c) to provide, in the first control, third control to manipulate the first switch to disconnect the auxiliary power supply from the load current generation unit and to manipulate the second switch to connect between the auxiliary power supply and the load, thereby stopping charging the auxiliary power supply using the current from the load current generation unit and supplying the auxiliary current from the auxiliary power supply to the load; and
(d) to provide, in the second control, fourth control to manipulate the first switch to connect between the auxiliary power supply and the load current generation unit and to manipulate the second switch to disconnect the auxiliary power supply from the load, thereby charging the auxiliary power supply using the current from the load current generation unit and stopping supplying the auxiliary current from the auxiliary power supply to the load.

2. The image forming apparatus according to claim 1, wherein in order to allow the fuser current to take on the target value by the feedback control during a peak period or a period of the load current in which the total current would exceed the limit value without providing control to supply the auxiliary current to the load or without providing the feedforward control to the fuser current, the fuser current generation unit is further configured to set an amount of decrease in the fuser current and the auxiliary power supply is further configured to set a value of the auxiliary current that can be supplied to the load.

3. The image forming apparatus according to claim 1, further comprising an auxiliary current measurement unit configured to measure the auxiliary current;
 wherein the total-current control unit is further configured to provide the fourth control after the third control when the auxiliary current measured by the auxiliary current measurement unit has increased to a predetermined threshold value.

4. The image forming apparatus according to claim 1, further comprising a load current measurement unit configured to measure the load current;
 wherein the total-current control unit is further configured to employ, as the total current, a value that is obtained by adding a value of the fuser current for which the total-current control unit commanded the fuser current generation unit and a value of the load current measured by the load current measurement unit.

\* \* \* \* \*